US010280253B2

(12) United States Patent
Furuko et al.

(10) Patent No.: US 10,280,253 B2
(45) Date of Patent: May 7, 2019

(54) CYCLIC OLEFIN RING-OPENED POLYMER HYDRIDE, RESIN MOLDED ARTICLE, AND OPTICAL MEMBER

(71) Applicant: ZEON CORPORATION, Chiyoda-ku, Tokyo (JP)

(72) Inventors: Akira Furuko, Tokyo (JP); Takashi Houkawa, Tokyo (JP); Ayumi Sato, Tokyo (JP); Kenji Umeda, Tokyo (JP)

(73) Assignee: Zeon Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/514,160

(22) PCT Filed: Sep. 24, 2015

(86) PCT No.: PCT/JP2015/076944
§ 371 (c)(1),
(2) Date: Mar. 24, 2017

(87) PCT Pub. No.: WO2016/052302
PCT Pub. Date: Apr. 7, 2016

(65) Prior Publication Data
US 2017/0306080 A1    Oct. 26, 2017

(30) Foreign Application Priority Data
Sep. 29, 2014 (JP) ................. 2014-198133

(51) Int. Cl.
*C08G 61/08* (2006.01)
*G02B 1/04* (2006.01)

(52) U.S. Cl.
CPC ............. *C08G 61/08* (2013.01); *G02B 1/041* (2013.01); *C08G 2261/124* (2013.01); *C08G 2261/228* (2013.01); *C08G 2261/3324* (2013.01); *C08G 2261/3325* (2013.01); *C08G 2261/418* (2013.01); *C08G 2261/592* (2013.01); *C08G 2261/724* (2013.01)

(58) Field of Classification Search
CPC ............. C08G 61/08; C08G 2261/124; C08G 2261/228; C08G 2261/3324; C08G 2261/3325; C08G 2261/418; C08G 2261/592; C08G 2261/724; G02B 2261/124; G02B 1/041
See application file for complete search history.

(56) References Cited

U.S. PATENT DOCUMENTS

| 5,319,034 A | 6/1994 | Shen et al. |
| 2007/0185290 A1 | 8/2007 | Hayano et al. |

FOREIGN PATENT DOCUMENTS

| JP | H05345817 A | 12/1993 |
| JP | 2005089744 A | 4/2005 |
| JP | 2006052333 A | 2/2006 |
| JP | 2007137935 A | 6/2007 |
| JP | 2008013604 A | 1/2008 |

OTHER PUBLICATIONS

Autenrieth, Benjamin et al., "Stereospecific Ring-Opening Metathesis Polymerization (ROMP) of Norbornene and Tetracyclododecene by Mo and W Initiators", Macromolecules, Apr. 7, 2015, vol. 48, Issue 8, pp. 2493-2503.
Dec. 28, 2015, International Search Report issued in the International Patent Application No. PCT/JP2015/076944.
Apr. 18, 2018, Extended European Search Report issued by the European Patent Office in the corresponding European Patent Application No. 15848000.4.

*Primary Examiner* — Irina S Zemel
*Assistant Examiner* — Jeffrey S Lenihan
(74) *Attorney, Agent, or Firm* — Kenja IP Law PC

(57) ABSTRACT

The present invention is a hydrogenated cycloolefin ring-opening polymer comprising a repeating unit derived from tetracyclododecene, and a repeating unit derived from an additional norbornene-based monomer,
the hydrogenated cycloolefin ring-opening polymer having a racemo diad ratio of 65% or more with respect to the repeating unit derived from tetracyclododecene,
the hydrogenated cycloolefin ring-opening polymer having a weight average molecular weight (Mw) of 10,000 to 40,000, and
a resin formed article obtained by forming the hydrogenated cycloolefin ring-opening polymer having a glass transition temperature of 140 to 165° C., a melt flow rate of 8 g/10 min or more as measured at a temperature of 280° C. under a load of 21.18 N, and a flexural strength of 60 MPa or more as measured by a flexural test at a test speed of 2 mm/min, and
a resin formed article, and
an optical member.

4 Claims, 1 Drawing Sheet

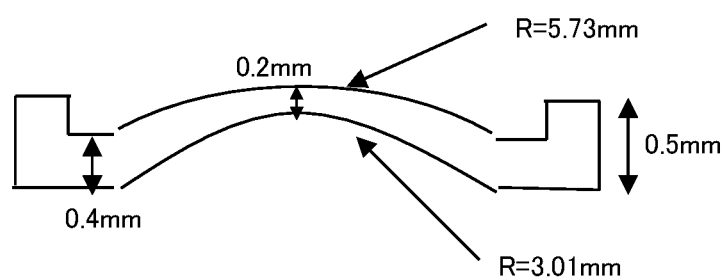
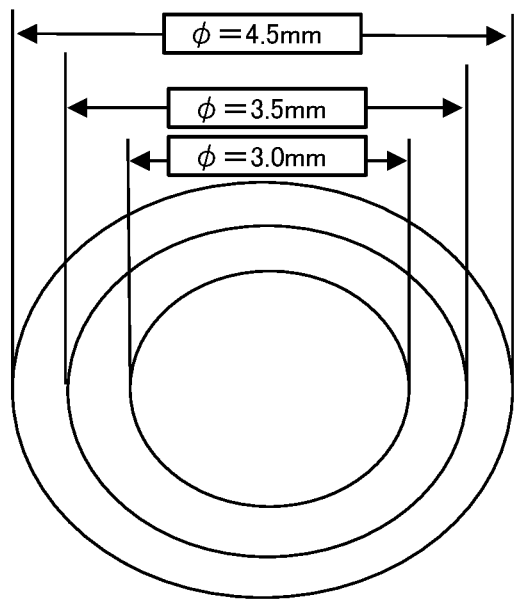

US 10,280,253 B2

CYCLIC OLEFIN RING-OPENED POLYMER HYDRIDE, RESIN MOLDED ARTICLE, AND OPTICAL MEMBER

TECHNICAL FIELD

The present invention relates to a hydrogenated cycloolefin ring-opening polymer that exhibits excellent thermal yellowing resistance (i.e., the hydrogenated cycloolefin ring-opening polymer rarely yellows even when allowed to stand at a high temperature for a long time), excellent high-temperature dimensional stability (i.e., the hydrogenated cycloolefin ring-opening polymer rarely changes in size even when allowed to stand at a high temperature for a long time), and excellent formability, a formed article (resin formed article) obtained using the hydrogenated cycloolefin ring-opening polymer, and an optical member that includes the resin formed article.

BACKGROUND ART

In recent years, a camera and the like have been installed in automobiles and the like in order to determine the environment, and record travel information and the like.

Since the temperature inside automobiles and the like increases to a large extent depending on the season, a raw material for producing a lens used for such a camera is required to exhibit excellent thermal yellowing resistance and excellent high-temperature dimensional stability in addition to excellent optical characteristics (e.g., transparency).

A hydrogenated cycloolefin ring-opening polymer is known as a resin that exhibits excellent transparency and excellent high-temperature dimensional stability.

For example, Patent Literature 1 discloses a hydrogenated tetracyclododecene ring-opening polymer that includes a repeating unit (A) derived from tetracyclododecene in a ratio of 55 to 100 mol % based on the total amount of repeating units, includes a repeating unit (B) derived from an additional norbornene compound in a ratio of 0 to 45 mol % based on the total amount of repeating units, and exhibits excellent solubility in an organic solvent.

The hydrogenated tetracyclododecene ring-opening polymer disclosed in Patent Literature 1 has a high glass transition temperature, and exhibits excellent high-temperature dimensional stability.

CITATION LIST

Patent Literature

Patent Literature 1: JP-A-2007-137935

SUMMARY OF INVENTION

Technical Problem

A hydrogenated tetracyclododecene ring-opening polymer normally has a high glass transition temperature, and exhibits excellent high-temperature dimensional stability.

However, a hydrogenated tetracyclododecene ring-opening polymer tends to exhibit inferior formability. Specifically, when a resin formed article is produced using a hydrogenated tetracyclododecene ring-opening polymer, a significant weld line (i.e., a thin line that occurs in a molten resin merge-fusion area within a mold (die) when forming a resin) may be observed. When a hydrogenated polymer is produced by copolymerizing tetracyclododecene and an additional cycloolefin monomer, or produced to have a reduced molecular weight in order to improve formability and the like, the resulting hydrogenated polymer may exhibit inferior thermal yellowing resistance or strength, or may exhibit inferior high-temperature dimensional stability.

The invention was conceived in view of the above situation. An object of the invention is to provide a hydrogenated cycloolefin ring-opening polymer that exhibits excellent thermal yellowing resistance, excellent high-temperature dimensional stability, and excellent formability, a resin formed article obtained using the hydrogenated cycloolefin ring-opening polymer, and an optical member that includes the resin formed article.

Solution to Problem

The inventors conducted extensive studies with regard to a hydrogenated cycloolefin ring-opening polymer that includes a repeating unit derived from tetracyclododecene in order to solve the above problem. As a result, the inventors found that a hydrogenated cycloolefin ring-opening polymer that includes a repeating unit derived from tetracyclododecene, and a repeating unit derived from an additional norbornene-based monomer, the hydrogenated cycloolefin ring-opening polymer including the repeating unit derived from tetracyclododecene in a ratio of 55 wt % or more and less than 100 wt % based on the total amount of repeating units, including the repeating unit derived from the additional norbornene-based monomer in a ratio of more than 0 wt % and 45 wt % or less based on the total amount of repeating units, having a racemo diad ratio of 65% or more with respect to the repeating unit derived from tetracyclododecene, and having a weight average molecular weight (Mw) of 10,000 to 40,000, and a resin formed article obtained by forming the hydrogenated cycloolefin ring-opening polymer having a glass transition temperature, a melt flow rate, and a flexural strength within specific ranges, exhibits excellent thermal yellowing resistance, excellent high-temperature dimensional stability, and excellent formability. This finding has led to the completion of the invention.

Several aspects of the invention provide the following hydrogenated cycloolefin ring-opening polymer (see (1) and (2)), resin formed article (see (3)), and optical member (see (4)).

(1) A hydrogenated cycloolefin ring-opening polymer including a repeating unit derived from tetracyclododecene, and a repeating unit derived from an additional norbornene-based monomer,
  the hydrogenated cycloolefin ring-opening polymer including the repeating unit derived from tetracyclododecene in a ratio of 55 wt % or more and less than 100 wt % based on the total amount of repeating units, and including the repeating unit derived from the additional norbornene-based monomer in a ratio of more than 0 wt % and 45 wt % or less based on the total amount of repeating units,
  the hydrogenated cycloolefin ring-opening polymer having a racemo diad ratio of 65% or more with respect to the repeating unit derived from tetracyclododecene,
  the hydrogenated cycloolefin ring-opening polymer having a weight average molecular weight (Mw) of 10,000 to 40,000, and
  wherein a resin formed article obtained by forming the hydrogenated cycloolefin ring-opening polymer, has a glass transition temperature of 140 to 165° C., a melt flow rate of 8 g/10 min or more as measured in accordance with JIS K 6719 at a temperature of 280° C. under a load of 21.18 N, and a flexural strength of 60 MPa or more as measured by a flexural test in accordance with JIS K 7171 at a test speed of 2 mm/min.

(2) The hydrogenated cycloolefin ring-opening polymer according to (1), the hydrogenated cycloolefin ring-opening polymer including a repeating unit derived from a polycyclic norbornene-based monomer that has a polycyclic structure having three or more rings in a ratio of 95 wt % or more based on the total amount of repeating units.

(3) A resin formed article obtained by forming a resin composition that includes the hydrogenated cycloolefin ring-opening polymer according to (1) or (2).

(4) The resin formed article according to (3), the resin formed article having a glass transition temperature of 140 to 165° C., a melt flow rate of 8 g/10 min or more as measured in accordance with JIS K 6719 at a temperature of 280° C. under a load of 21.18 N, and a flexural strength of 60 MPa or more as measured by a flexural test in accordance with JIS K 7171 at a test speed of 2 mm/min.

Advantageous Effects of Invention

The aspects of the invention thus provide a hydrogenated cycloolefin ring-opening polymer that exhibits excellent thermal yellowing resistance, excellent high-temperature dimensional stability, and excellent formability, a resin formed article obtained using the hydrogenated cycloolefin ring-opening polymer, and an optical member that includes the resin formed article.

BRIEF DESCRIPTION OF DRAWINGS

FIGURE is a view illustrating the lens mold used in connection with the examples.

DESCRIPTION OF EMBODIMENTS

A hydrogenated cycloolefin ring-opening polymer, a resin formed article, and an optical member according to the exemplary embodiments of the invention are described in detail below.

1) Hydrogenated Cycloolefin Ring-Opening Polymer

A hydrogenated cycloolefin ring-opening polymer according to one embodiment of the invention includes a repeating unit derived from tetracyclododecene, and a repeating unit derived from an additional norbornene-based monomer, the hydrogenated cycloolefin ring-opening polymer including the repeating unit derived from tetracyclododecene in a ratio of 55 wt % or more and less than 100 wt % based on the total amount of repeating units, and including the repeating unit derived from the additional norbornene-based monomer in a ratio of more than 0 wt % and 45 wt % or less based on the total amount of repeating units, the hydrogenated cycloolefin ring-opening polymer having a racemo diad ratio of 65% or more with respect to the repeating unit derived from tetracyclododecene, the hydrogenated cycloolefin ring-opening polymer having a weight average molecular weight (Mw) of 10,000 to 40,000, and a resin formed article obtained by forming the hydrogenated cycloolefin ring-opening polymer having a glass transition temperature of 140 to 165° C., a melt flow rate of 8 g/10 min or more as measured in accordance with JIS K 6719 at a temperature of 280° C. under a load of 21.18 N, and a flexural strength of 60 MPa or more as measured by a flexural test in accordance with JIS K 7171 at a test speed of 2 mm/min.

Structure of Hydrogenated Cycloolefin Ring-Opening Polymer

The hydrogenated cycloolefin ring-opening polymer according to one embodiment of the invention includes the repeating unit derived from tetracyclododecene (hereinafter may be referred to as "repeating unit (A)"), and the repeating unit derived from the additional norbornene-based monomer (hereinafter may be referred to as "repeating unit (B)").

The repeating unit (A) included in the hydrogenated cycloolefin ring-opening polymer according to one embodiment of the invention is represented by the following formula (1).

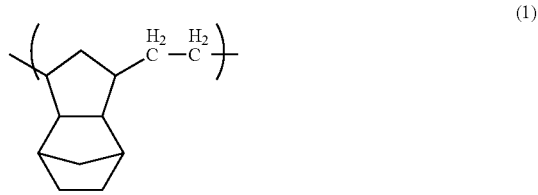

(1)

The repeating unit (A) is formed as described below. Specifically, tetracyclododecene represented by the following formula (2) is subjected to ring-opening polymerization.

(2)

The carbon-carbon double bonds included in the main chain of the resulting ring-opening polymer are hydrogenated to form the repeating unit (A).

The hydrogenated cycloolefin ring-opening polymer includes the repeating unit (A) in a ratio of 55 wt % or more and less than 100 wt %, preferably 55 to 90 wt %, and more preferably 60 to 85 wt %, based on the total amount of repeating units.

The hydrogenated cycloolefin ring-opening polymer according to one embodiment of the invention that includes the repeating unit (A) in a ratio of 55 wt % or more, exhibits excellent thermal yellowing resistance and high-temperature dimensional stability.

The hydrogenated cycloolefin ring-opening polymer according to one embodiment of the invention has a racemo diad ratio of 65% or more, preferably 70% or more, and more preferably 75% or more, with respect to the repeating unit (A).

The hydrogenated cycloolefin ring-opening polymer according to one embodiment of the invention that has such a controlled steric structure, exhibits excellent solubility in an organic solvent, and can be produced with high productivity on an industrial scale.

The racemo diad ratio in the hydrogenated cycloolefin ring-opening polymer may be determined by subjecting the hydrogenated cycloolefin ring-opening polymer to $^{13}$C-NMR measurement at 100° C. using deuterated o-dichlorobenzene as a solvent, and calculating the racemo diad ratio based on the intensity ratio of the signal (51.82 ppm) attributed to racemo diads to the signal (51.77 ppm) attributed to meso diads.

Note that the position of each signal may differ to some extent from the above position depending on the type of repeating unit (B) and the measurement conditions, but the racemo diad ratio can be basically calculated as described above.

The hydrogenated cycloolefin ring-opening polymer that has a racemo diad ratio of 65% or more with respect to the repeating unit (A) can be efficiently produced by utilizing a polymerization catalyst that includes the transition metal imide compound described later when effecting the ring-opening polymerization reaction.

The repeating unit (B) included in the hydrogenated cycloolefin ring-opening polymer according to one embodiment of the invention is a repeating unit derived from a norbornene-based monomer other than tetracyclododecene. The term "norbornene-based monomer" used herein refers to a monomer that includes the norbornene skeleton represented by the following formula (3).

(3)

Examples of the repeating unit (B) include a repeating unit represented by the following formula (4), and

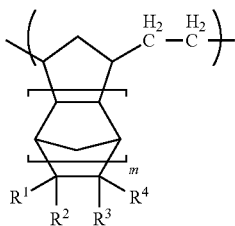
(4)

a repeating unit represented by the following formula (5).

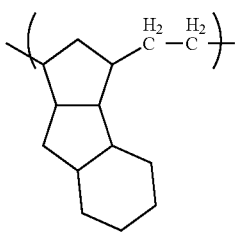
(5)

Each of $R^1$ to $R^4$ in the formula (4) independently represents a hydrogen atom, a hydrocarbon group having 1 to 20 carbon atoms, or a substituent that includes a halogen atom, a silicon atom, an oxygen atom, or a nitrogen atom, and $R^2$ and $R^3$ are optionally bonded to each other to form a ring. $R^1$ and $R^2$ or $R^3$ and $R^4$ are optionally bonded to each other to form an alkylidene group. m represents an integer from 0 to 2.

Note that a case where m is 1 and all of $R^1$ to $R^4$ are hydrogen atoms (i.e., a case where the repeating unit represented by the formula (4) is a repeating unit derived from tetracyclododecene) is excluded.

Examples of the hydrocarbon group having 1 to 20 carbon atoms that may be represented by $R^1$ to $R^4$ include an alkyl group such as a methyl group, an ethyl group, an n-propyl group, an n-butyl group, a t-butyl group, an n-pentyl group, an n-hexyl group, and an n-decyl group; a cycloalkyl group such as a cyclopentyl group and a cyclohexyl group; an alkylidene group such as a methylidyne group and an ethylidene group; an alkenyl group such as a vinyl group and a propenyl group; a cycloalkenyl group such as a cyclohexenyl group and a cyclopentenyl group; an alkynyl group such as an ethynyl group and a propargyl group; an aryl group such as a phenyl group; and the like.

Examples of the substituent that includes a halogen atom, a silicon atom, an oxygen atom, or a nitrogen atom, include an alkoxy group such as a methoxy group and an ethoxy group; a hydroxy group; a hydroxyalkyl group such as a hydroxymethyl group and a 2-hydroxyethyl group; a carboxy group; an alkoxycarbonyl group such as a methoxycarbonyl group and an ethoxycarbonyl group; a cyano group; a trialkylsilyl group such as a trimethylsilyl group; a trialkoxysilyl group such as a trimethoxysilyl group; a halogen atom such as a fluorine atom, a chlorine atom, a bromine atom, and an iodine atom; and the like.

The repeating unit (B) is formed by subjecting one type or two or more types of corresponding norbornene-based monomer to ring-opening polymerization, and hydrogenating the carbon-carbon double bonds included in the main chain and the side chain of the resulting ring-opening polymer, for example.

Examples of the norbornene-based monomer include a bicyclic norbornene-based monomer such as bicyclo[2.2.1]hept-2-ene (trivial name: norbornene) and 5-ethylidenebicyclo[2.2.1]hept-2-ene (trivial name: ethylidenenorbornene); a tricyclic norbornene-based monomer such as tricyclo[4.3.0$^{1,6}$.1$^{2,5}$]deca-3,7-diene (trivial name: dicyclopentadiene); a tetracyclic norbornene-based monomer such as 6-ethylidene-2-tetracyclododecene and 7,8-benzotricyclo[4.3.0.1$^{2,5}$]dec-3-ene (trivial name: methanotetrahydrofluorene (also referred to as 1,4-methano-1,4,4a,9a-tetrahydrofluorene)); and the like.

The hydrogenated cycloolefin ring-opening polymer includes the repeating unit (B) in a ratio of more than 0 wt % and 45 wt % or less, preferably 10 to 45 wt %, and more preferably 15 to 40 wt %, based on the total amount of repeating units.

The hydrogenated cycloolefin ring-opening polymer according to one embodiment of the invention that includes the repeating unit (B), exhibits strength and formability in a well-balanced manner. The hydrogenated cycloolefin ring-opening polymer according to one embodiment of the invention that includes the repeating unit (B) in a ratio of 45 wt % or less, exhibits excellent thermal yellowing resistance and high-temperature dimensional stability.

The hydrogenated cycloolefin ring-opening polymer according to one embodiment of the invention preferably includes a repeating unit derived from a polycyclic norbornene-based monomer that has a polycyclic structure having three or more rings (including a repeating unit derived from tetracyclododecene) in a ratio of 95 wt % or more, more preferably 98 wt % or more, and still more preferably 100 wt %, based on the total amount of repeating units. The polycyclic norbornene-based monomer that has a polycyclic structure having three or more rings is preferably a monomer selected from the group consisting of a tricyclic norbornene-based monomer and a tetracyclic norbornene-based monomer.

The hydrogenated cycloolefin ring-opening polymer according to one embodiment of the invention preferably includes a repeating unit derived from a tetracyclic norbornene-based monomer (including a repeating unit derived from tetracyclododecene) in a ratio of 90 wt % or more, and more preferably 95 wt % or more, based on the total amount of repeating units.

A hydrogenated cycloolefin ring-opening polymer that meets these requirements exhibits thermal yellowing resistance, high-temperature dimensional stability, and formability in a further well-balanced manner.

Method for Producing Hydrogenated Cycloolefin Ring-Opening Polymer

The hydrogenated cycloolefin ring-opening polymer according to one embodiment of the invention may be produced using an arbitrary method. For example, the desired hydrogenated cycloolefin ring-opening polymer can be obtained by subjecting tetracyclododecene and the additional norbornene-based monomer to a ring-opening polymerization reaction in the presence of a polymerization catalyst, and hydrogenating the carbon-carbon double bonds included in the resulting cycloolefin ring-opening polymer in the presence of a hydrogenation catalyst.

The polymerization catalyst is not particularly limited. It is preferable to use a polymerization catalyst that includes a transition metal imide compound having a structure in which an alkyl imide or an aryl imide (i.e., ligand) is bonded to a transition metal among the transition metals that belong to Group 6 in the periodic table, since it is possible to easily obtain a hydrogenated tetracyclododecene-based ring-opening polymer that has a racemo diad ratio of 65% or more with respect to the repeating unit (A).

Examples of the transition metal imide compound include a compound represented by the following formula (6).

$$R^5\text{--}N=M^1(L^1)_a(X^1)_b \quad (6)$$

In the formula (6), $M^1$ represents a transition metal (transition metal atom) among the transition metals (transition metal atoms) that belong to Group 6 in the periodic table, $L^1$ represents a neutral ligand, and $X^1$ represents an anionic ligand. $R^5$ represents a substituted or unsubstituted alkyl group having 1 to 20 carbon atoms, or a substituted or unsubstituted aryl group.

a is 0, 1, or 2, and b is an integer from 1 to 4.

When a is 2, $L^1$ are either identical to or different from each other, and are optionally bonded to each other to form a chelate ligand.

When b is 2 or more, $X^1$ are either identical to or different from each other, and are optionally bonded to each other to form a chelate ligand.

$R^5$ is optionally bonded to either or both of $L^1$ and $X^1$ to form a chelate ligand.

The transition metal among the transition metals that belong to Group 6 in the periodic table that is represented by $M^1$ is a metal selected from chromium (Cr), molybdenum (Mo), and tungsten (W). Among these, molybdenum and tungsten are preferable, and tungsten is particularly preferable.

The neutral ligand represented by $L^1$ is a ligand that is neutrally charged when separated from the center metal. Specific examples of the neutral ligand include, but are not limited to, ethers such as diethyl ether and tetrahydrofuran; ketones such as acetone and cyclohexanone; nitriles such as acetonitrile and benzonitrile; amines such as triethylamine and N,N-diethylaniline; pyridines such as pyridine and lutidine; phosphines such as triphenylphosphine; amides such as dimethylformamide; sulfoxides such as dimethyl sulfoxide; cyclooctadiene; water; carbon monoxide; arenes such as toluene and xylene; phosphine oxides such as triphenylphosphine oxide; carbonic acid esters such as ethylene carbonate; esters such as ethyl acetate; and the like.

Among these, ethers, pyridines and nitriles are preferable from the viewpoint of forming a stable transition metal imide compound.

The anionic ligand represented by $X^1$ is a ligand that is negatively charged when separated from the center metal. Specific examples of the anionic ligand include, but are not limited to, a halogen atom such as F, Br, Cl, and I; a hydrido ligand; a diketonate group such as acetylacetonate; a substituted or unsubstituted cyclopentadienyl group; a substituted or unsubstituted allyl group; an alkenyl group; an alkyl group; a substituted or unsubstituted aryl group; an alkoxy group; a substituted or unsubstituted aryloxy group; an alkoxycarbonyl group; a carboxy group; an alkyl sulfonate group; a substituted or unsubstituted aryl sulfonate group; an alkylthio group; an alkenylthio group; a substituted or unsubstituted arylthio group; an alkylsulfonyl group; an alkylsulfinyl group; and the like.

Among these, a halogen atom, an alkyl group, an aryl group, an alkoxy group, and an aryloxy group are preferable from the viewpoint of forming a stable transition metal imide compound.

Examples of the alkyl group when $R^5$ represents the substituted or unsubstituted alkyl group having 1 to 20 carbon atoms, include a linear alkyl group such as a methyl group, an ethyl group, an n-propyl group, an n-butyl group, and an n-hexyl group; a branched alkyl group such as an isopropyl group, an isobutyl group, and a t-butyl group; a cycloalkyl group such as a cyclohexyl group and an adamantyl group; and the like.

Examples of a substituent that may substitute the alkyl group include a halogen atom such as a fluorine atom, a chlorine atom, and a bromine atom; an aryl group such as a phenyl group; and the like.

Examples of the aryl group when $R^5$ represents the substituted or unsubstituted aryl group, include a phenyl group, a 1-naphthyl group, a 2-naphthyl group, a 2-biphenyl group, a 4-biphenyl group, and the like.

Examples of a substituent that may substitute the aryl group include an alkyl group such as a methyl group, an ethyl group, and an isopropyl group; a halogen atom such as a fluorine atom, a chlorine atom, and a bromine atom; and the like.

Examples of the compound represented by the formula (6) include tungsten(ethylimido)(tetrachloride)(diethyl ether), tungsten(ethylimido)(t-butoxide)(trichloride), tungsten(ethylimido)[di(t-butoxide)](dichloride), tungsten(ethylimido)[tri(t-butoxide)](ichloride), tungsten(ethylimido)[tetra(t-butoxide)], tungsten(ethylimido)(phenoxide)(tetrachloride)(diethyl ether), tungsten(n-butylimido)(tetrachloride)(tetrahydrofuran), tungsten(n-hexylimido)(tetrachloride)(diethyl ether), tungsten(i-propylimido)(tetrachloride)(diethyl ether), tungsten(cyclohexylimido)(tetrachloride)(diethyl ether), tungsten(adamantylimido)(tetrachloride)(diethyl ether), tungsten(benzylimido)(tetrachloride)(diethyl ether), tungsten(phenylimido)(tetrachloride)(diethyl ether), tungsten(phenylimido)(tetrachloride)(tetrahydrofuran), tungsten(2,6-dimethylphenylimido)(tetrachloride)(diethyl ether), tungsten[2,6-di(i-propyl)(phenylimido)](tetrachloride)(diethyl ether), and the like. Among these, tungsten(phenylimido)(tetrachloride)(tetrahydrofuran) is particularly preferable.

The compound represented by the formula (6) may be synthesized using a known method, such as the method disclosed in JP-A-5-345817, for example. For example, a tungsten imido compound may be synthesized by reacting tungsten oxytetrachloride with an isocyanate that includes the desired substituent.

The compound represented by the formula (6) may be isolated, purified, and used as the polymerization catalyst, or the reaction mixture that includes the compound represented by the formula (6) may be used as the polymerization catalyst in the form of a liquid without isolating and purifying the compound represented by the formula (6).

The transition metal imide compound is normally used so that the molar ratio ((center metal included in transition metal imide compound):(norbornene-based monomer)) of the center metal included in the transition metal imide compound to the norbornene-based monomer is 1:100 to 1:2,000,000, preferably 1:200 to 1:1,000,000, and more preferably 1:500 to 1:500,000. If the transition metal imide compound is used in too large an amount, it may be difficult to remove the catalyst. If the transition metal imide compound is used in too small an amount, sufficient polymerization activity may not be obtained.

The transition metal imide compound may be used in combination with an organometallic reducing agent. It is possible to improve catalytic activity by utilizing the transition metal imide compound in combination with an organometallic reducing agent.

Examples of the organometallic reducing agent include a compound that includes a hydrocarbon group having 1 to 20 carbon atoms, and an element among the elements that respectively belong to Groups 1, 2, 12, 13, and 14 in the periodic table. An organolithium, an organomagnesium, an organozinc, an organoaluminum, and an organotin are preferable, and an organolithium, an organoaluminum, and an organotin are particularly preferable.

Examples of the organolithium include methyllithium, n-butyllithium, neopentyllithium, neophyllithium, phenyllithium, and the like.

Examples of the organomagnesium include butylethylmagnesium, butyloctylmagnesium, dihexylmagnesium, ethylmagnesium chloride, n-butylmagnesium chloride, allylmagnesium bromide, neopentylmagnesium chloride, neophylmagnesium chloride, and the like.

Examples of the organozinc include dimethylzinc, diethylzinc, diphenylzinc, and the like.

Examples of the organoaluminum include an alkylaluminum such as trimethylaluminum, triethylaluminum, and triisobutylaluminum; an alkylaluminum alkoxide such as dimethylaluminum methoxide, methylaluminum dimethoxide, dimethylaluminum butoxide, diethylaluminum ethoxide, ethylaluminum diethoxide, and diisobutylaluminum isobutoxide; an alkylaluminum aryloxide such as dimethylaluminum phenoxide, diethylaluminum phenoxide, and diisobutylaluminum phenoxide; an alkylaluminum halide such as diethylaluminum chloride, ethylaluminum sesquichloride, and ethylaluminum dichloride; an aluminoxane such as methylaluminoxane, ethylaluminoxane, and isobutylaluminoxane; and the like.

Examples of the organotin include tetramethyltin, tetra(n-butyl)tin, tetraphenyltin, and the like.

The organometallic reducing agent is used in an appropriate amount taking account of the type of organometallic reducing agent. The organometallic reducing agent is preferably used in an amount of 0.1 to 1,000-fold mol, more preferably 0.2 to 500-fold mol, and particularly preferably 0.5 to 200-fold mol, based on the center metal included in the transition metal imide compound. If the organometallic reducing agent is used in an amount of less than 0.1-fold mol based on the center metal included in the transition metal imide compound, it may be difficult to sufficiently improve the polymerization activity. If the organometallic reducing agent is used in an amount of more than 1,000-fold mol based on the center metal included in the transition metal imide compound, side reactions tend to occur.

When effecting the ring-opening polymerization reaction, a Lewis base may be added to the polymerization reaction system in order to control the polymerization rate and the molecular weight distribution of the resulting ring-opening polymer.

The Lewis base is not particularly limited. Examples of the Lewis base include ethers such as diethyl ether and tetrahydrofuran; ketones such as acetone and cyclohexanone; nitriles such as acetonitrile and benzonitrile; amines such as triethylamine and N,N-diethylaniline; pyridines such as pyridine and lutidine; phosphines such as triphenylphosphine; amides such as dimethylformamide; sulfoxides such as dimethyl sulfoxide; phosphine oxides such as triphenylphosphine oxide; esters such as ethyl acetate; and the like. Among these, ethers, pyridines and nitriles are preferable.

The Lewis base is preferably used in an amount of 0.1 to 1,000-fold mol, and more preferably 0.2 to 500-fold mol, based on the center metal included in the transition metal imide compound.

The ring-opening polymerization reaction is normally effected in an organic solvent. The organic solvent is not particularly limited as long as the organic solvent does not affect the polymerization reaction, and dissolves or disperses the resulting polymer under specific conditions.

Examples of the organic solvent include an aliphatic hydrocarbon such as pentane, hexane, and heptane; an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindenecyclohexane and cyclooctane; an aromatic hydrocarbon such as benzene, toluene, and xylene; a halogen-containing aliphatic hydrocarbon such as dichloromethane, chloroform, and 1,2-dichloroethane; a halogen-containing aromatic hydrocarbon such as chlorobenzene and dichlorobenzene; a nitrogen-containing hydrocarbon-based solvent such as nitromethane, nitrobenzene, and acetonitrile; an ether-based solvent such as diethyl ether and tetrahydrofuran; an aromatic ether-based solvent such as anisole and phenetole; and the like.

Among these, an aromatic hydrocarbon-based solvent, an aliphatic hydrocarbon-based solvent, an alicyclic hydrocarbon-based solvent, an ether-based solvent, and an aromatic ether-based solvent that are widely used industrially are preferable.

When effecting the ring-opening polymerization reaction, a molecular weight modifier such as a vinyl compound or a diene compound may be added to the polymerization reaction system in order to adjust the molecular weight of the resulting ring-opening polymer.

The vinyl compound that may be used to adjust the molecular weight of the ring-opening polymer is not particularly limited as long as the vinyl compound is an organic compound that includes a vinyl group. Examples of the vinyl compound include α-olefins such as 1-butene, 1-pentene, 1-hexene, and 1-octene; styrenes such as styrene and vinyltoluene; ethers such as ethyl vinyl ether, isobutyl vinyl ether, and allyl glycidyl ether; a halogen-containing vinyl compound such as allyl chloride; an oxygen-containing vinyl compound such as allyl acetate, allyl alcohol, and glycidyl methacrylate; a nitrogen-containing vinyl compound such as acrylamide; and the like.

Examples of the diene compound that may be used to adjust the molecular weight of the ring-opening polymer include a non-conjugated diene such as 1,4-pentadiene, 1,4-hexadiene, 1,5-hexadiene, 1,6-heptadiene, 2-methyl-1,4-pentadiene, and 2,5-dimethyl-1,5-hexadiene; a conjugated diene such as 1,3-butadiene, 2-methyl-1,3-butadiene, 2,3-dimethyl-1,3-butadiene, 1,3-pentadiene, and 1,3-hexadiene; and the like.

The molecular weight modifier may be used in an arbitrary amount within a range from 0.1 mol % to 10 mol % based on the norbornene-based monomer, for example.

The concentration of the norbornene-based monomer when effecting the ring-opening polymerization reaction is not particularly limited, but is normally 1 to 50 wt %, preferably 2 to 45 wt %, and more preferably 3 to 40 wt %.

The polymerization temperature is not particularly limited, but is normally −30 to +200° C., and preferably 0 to 180° C.

The polymerization time is normally 1 minute to 100 hours.

The hydrogenated cycloolefin ring-opening polymer according to one embodiment of the invention can be obtained by hydrogenating the carbon-carbon double bonds included in the cycloolefin ring-opening polymer obtained by effecting the ring-opening polymerization reaction as described above in the presence of a hydrogenation catalyst.

The hydrogenation catalyst may be a homogeneous catalyst, or may be a heterogeneous catalyst.

A homogeneous catalyst has an advantage in that it is easily dispersed in a hydrogenation reaction mixture, and the amount of catalyst to be added can be reduced. Since a homogeneous catalyst exhibits sufficient activity even when the temperature and the pressure are not increased to a large extent, decomposition and gelation of the cycloolefin ring-opening polymer and a hydrogenated product thereof do not easily occur. Therefore, it is preferable to use a homogeneous catalyst from the viewpoint of cost and the quality of the product.

On the other hand, a heterogeneous catalyst has an advantage in that it exhibits particularly excellent activity at a high temperature under high pressure, and the cycloolefin ring-opening polymer can be hydrogenated within a short time.

Examples of the homogeneous catalyst include a Wilkinson's complex (chlorotris(triphenylphosphine)rhodium(I)); a catalyst that includes a combination of a transition metal compound and an alkylmetal compound (e.g., cobalt acetate and triethylaluminum, nickel acetylacetonate and triisobutylaluminum, titanocene dichloride and n-butyllithium, zirconocene dichloride and sec-butyllithium, and tetrabutoxytitanate and dimethylmagnesium); and the like.

Examples of the heterogeneous catalyst include a catalyst in which a metal (e.g., Ni, Pd, Pt, Ru, and Rh) is supported on a support. When it is desired to reduce the amount of impurities included in the resulting hydrogenated product, it is preferable to use an adsorbent (e.g., alumina and diatomaceous earth) as the support.

The hydrogenation reaction is normally effected in an organic solvent. The organic solvent is not particularly limited as long as the organic solvent is inert to the hydrogenation reaction. A hydrocarbon-based solvent is normally used as the organic solvent since the resulting hydrogenated product can be easily dissolved. Examples of the hydrocarbon-based solvent include an aromatic hydrocarbon-based solvent such as benzene, toluene, and xylene; an aliphatic hydrocarbon-based solvent such as n-pentane, n-hexane, and n-heptane; an alicyclic hydrocarbon-based solvent such as cyclohexane, methylcyclohexane, decalin, and bicyclononane; and the like.

These organic solvents may be used either alone or in combination. Since a solvent that is suitable for a ring-opening polymerization reaction is normally also suitable as a solvent for a hydrogenation reaction, the hydrogenation catalyst may be added to the ring-opening polymerization reaction mixture, and the resulting mixture may be subjected to the hydrogenation reaction.

The hydrogenation reaction conditions may be appropriately selected taking account of the type of hydrogenation catalyst. The reaction temperature is normally −20 to +250° C., preferably −10 to +220° C., and more preferably 0 to 200° C.

The hydrogen pressure is normally 0.01 to 10.0 MPa, preferably 0.05 to 8.0 MPa, and more preferably 0.1 to 5.0 MPa.

The hydrogenation reaction time is appropriately selected to control the hydrogenation rate, but is normally 0.1 to 50 hours.

After completion of the hydrogenation reaction, the reaction mixture may be subjected to centrifugation, filtration, and the like to remove a catalyst residue. If necessary, a catalyst deactivation agent (e.g., water and alcohol) may be used, or an adsorbent (e.g., activated clay and alumina) may be added.

Properties of Hydrogenated Cycloolefin Ring-Opening Polymer

The weight average molecular weight of the hydrogenated cycloolefin ring-opening polymer according to one embodiment of the invention is 10,000 to 40,000, preferably 13,000 to 35,000, and more preferably 15,000 to 30,000. If the weight average molecular weight of the hydrogenated cycloolefin ring-opening polymer is too low, the resulting resin formed article may exhibit low mechanical strength. If the weight average molecular weight of the hydrogenated cycloolefin ring-opening polymer is too high, the hydrogenated cycloolefin ring-opening polymer may exhibit insufficient fluidity when melted, and may exhibit poor formability.

The molecular weight distribution (Mw/Mn) of the hydrogenated cycloolefin ring-opening polymer is not particularly limited, but is preferably 1 to 5, and more preferably 1 to 4.

The weight average molecular weight (Mw) and the number average molecular weight (Mn) of the hydrogenated cycloolefin ring-opening polymer refer to a standard isoprene-equivalent weight average molecular weight and a standard isoprene-equivalent number average molecular weight determined by gel permeation chromatography (GPC) (eluent: cyclohexane).

The hydrogenated cycloolefin ring-opening polymer according to one embodiment of the invention has a relatively high glass transition temperature, and exhibits excellent fluidity upon melting and excellent mechanical strength.

The resin formed article (hereinafter may be referred to as "resin formed article (α)") obtained by forming the hydrogenated cycloolefin ring-opening polymer according to one embodiment of the invention has a glass transition temperature of 140 to 165° C., preferably 145 to 165° C., and more preferably 145 to 160° C.

A cycloolefin polymer that produces a resin formed article (α) having a glass transition temperature of 140° C. or more exhibits excellent high-temperature dimensional stability. A cycloolefin polymer that produces a resin formed article (α) having a glass transition temperature of 160° C. or less exhibits excellent formability.

The glass transition temperature of the resin formed article (α) can be adjusted by appropriately selecting or adjusting the type and the amount of norbornene-based monomer used to produce the hydrogenated cycloolefin ring-opening polymer. For example, the resin formed article (α) obtained by forming the hydrogenated cycloolefin ring-opening polymer that includes a large amount of a repeating unit derived from a tetracyclic norbornene-based monomer (e.g., tetracyclododecene, 6-ethylidene-2-tetracyclododecene, and methanotetrahydrofluorene) tends to have a high glass transition temperature.

The resin formed article (α) has a melt flow rate of 8 g/10 min or more, preferably 10 g/10 min or more, and more preferably 15 g/10 min or more, as measured in accordance with JIS K 6719 at a temperature of 280° C. under a load of 21.18 N (2.16 kgf). The upper limit of the melt flow rate is not particularly limited, but is normally 80 g/10 min or less.

A hydrogenated cycloolefin ring-opening polymer that produces a resin formed article (α) having a melt flow rate of 8 g/10 min exhibits excellent formability.

The melt flow rate of the resin formed article (α) can be adjusted by appropriately selecting or adjusting the type and the amount of norbornene-based monomer used to produce the hydrogenated cycloolefin ring-opening polymer. For example, the resin formed article (α) obtained by forming the hydrogenated cycloolefin ring-opening polymer that includes a large amount of a repeating unit derived from methanotetrahydrofluorene as a repeating unit derived from a norbornene-based monomer other than tetracyclododecene, tends to have a high melt flow rate.

The melt flow rate of a synthetic resin can be increased by decreasing the weight average molecular weight of the synthetic resin. This property can be used in connection with the invention. However, since the mechanical strength of the resulting resin formed article may decrease if the weight average molecular weight is decreased to a large extent, it is preferable to increase the melt flow rate by appropriately selecting or adjusting the type and the amount of norbornene-based monomer other than tetracyclododecene without unduly decreasing the weight average molecular weight.

The resin formed article (α) has a flexural strength of 60 MPa or more, preferably 62 MPa or more, and more preferably 65 MPa or more, as measured by a flexural test in accordance with JIS K 7171 at a test speed of 2 mm/min. Note that the details of the flexural test are described later in connection with the examples. The upper limit of the flexural strength is not particularly limited, but is normally 150 MPa or less.

A hydrogenated cycloolefin ring-opening polymer that produces a resin formed article (α) having a flexural strength of 60 MPa or more exhibits excellent high-temperature dimensional stability.

The flexural strength of the resin formed article (α) can be adjusted by appropriately selecting or adjusting the type and the amount of norbornene-based monomer used to produce the hydrogenated cycloolefin ring-opening polymer. For example, the resin formed article (α) obtained by forming the hydrogenated cycloolefin ring-opening polymer that includes a large amount of a repeating unit derived from methanotetrahydrofluorene as a repeating unit derived from a norbornene-based monomer other than tetracyclododecene, tends to have high flexural strength.

A resin formed article used as a measurement specimen when measuring the glass transition temperature, the melt flow rate, and the flexural strength may include an additive as long as the measured values are not affected.

Since the hydrogenated cycloolefin ring-opening polymer according to one embodiment of the invention meets the requirements with regard to the structural features and the properties described above, the hydrogenated cycloolefin ring-opening polymer according to one embodiment of the invention exhibits excellent thermal yellowing resistance, excellent high-temperature dimensional stability, and excellent formability (i.e., a significant weld line does not occur).

The thermal yellowing resistance of the hydrogenated cycloolefin ring-opening polymer may be evaluated by subjecting the hydrogenated cycloolefin ring-opening polymer to a test in accordance with JIS K 7103, and calculating the change in yellowness index (ΔYI). Note that the details of the test are described later in connection with the examples.

The hydrogenated cycloolefin ring-opening polymer according to one embodiment of the invention normally has a change in yellowness index (ΔYI) of 20 or less, and preferably 15 or less.

The hydrogenated cycloolefin ring-opening polymer according to one embodiment of the invention that includes a large amount of a repeating unit derived from tetracyclododecene, exhibits excellent thermal yellowing resistance. There is a tendency that the hydrogenated cycloolefin ring-opening polymer according to one embodiment of the invention exhibits better thermal yellowing resistance when the hydrogenated cycloolefin ring-opening polymer includes a moderate amount of repeating unit derived from methanotetrahydrofluorene.

The high-temperature dimensional stability and the formability of the hydrogenated cycloolefin ring-opening polymer according to one embodiment of the invention may be evaluated using the methods described later in connection with the examples.

The hydrogenated cycloolefin ring-opening polymer according to one embodiment of the invention includes a large amount of a repeating unit derived from tetracyclododecene. The hydrogenated cycloolefin ring-opening polymer according to one embodiment of the invention exhibits improved fluidity upon melting while having a high glass transition temperature. Therefore, the hydrogenated cycloolefin ring-opening polymer according to one embodiment of the invention exhibits excellent high-temperature dimensional stability.

The hydrogenated cycloolefin ring-opening polymer according to one embodiment of the invention exhibits improved flexural strength while having a moderate weight average molecular weight. Therefore, the hydrogenated cycloolefin ring-opening polymer according to one embodiment of the invention exhibits excellent formability.

The hydrogenated cycloolefin ring-opening polymer according to one embodiment of the invention that has the above characteristics is useful as a raw material for producing an optical member for which heat resistance is desired.

2) Resin Formed Article and Optical Member

A resin formed article according to one embodiment of the invention is obtained by forming a resin composition that includes the hydrogenated cycloolefin ring-opening polymer according to one embodiment of the invention.

The resin composition may include an additional component (e.g., additive) as long as the advantageous effects of the invention are not impaired.

Examples of the additional component include an antioxidant, a UV absorber, a light stabilizer, a near-infrared absorber, a plasticizer, an antistatic agent, and the like.

Examples of the antioxidant include a phenol-based antioxidant, a phosphorus-based antioxidant, a sulfur-based antioxidant, and the like.

Examples of the phenol-based antioxidant include 3,5-di-t-butyl-4-hydroxytoluene, dibutylhydroxytoluene, 2,2'-methylenebis(6-t-butyl-4-methylphenol), 4,4'-butylidenebis(3-t-butyl-3-methylphenol), 4,4'-thiobis(6-t-butyl-3-methylphenol), α-tocopherol, 2,2,4-trimethyl-6-hydroxy-7-t-butylchromane, tetrakis[methylene-3-(3',5'-di-t-butyl-4'-hydroxyphenyl)propionate]methane, pentaerythritol tetrakis[3-(3,5-di-t-butyl-4-hydroxyphenyl)propionate], and the like. Among these, pentaerythritol tetrakis[3-(3,5-di-t-butyl-4-hydroxyphenyl)propionate] is particularly preferable.

When the resin composition includes the phenol-based antioxidant, the resin composition preferably includes the phenol-based antioxidant in a ratio of 0.01 to 5 parts by weight, more preferably 0.1 to 2 parts by weight, and still more preferably 0.2 to 1 part by weight, based on 100 parts by weight of the hydrogenated cycloolefin ring-opening polymer.

Examples of the phosphorus-based antioxidant include distearylpentaerythritol diphosphite, bis(2,4-di-t-butylphenyl)pentaerythritol diphosphite, tris(2,4-di-t-butylphenyl) phosphite, tetrakis(2,4-di-t-butylphenyl)-4,4'-biphenyl diphosphite, trinonylphenyl phosphite, and the like.

Examples of the sulfur-based antioxidant include distearyl thiodipropionate, dilauryl thiodipropionate, and the like.

Examples of the UV absorber include a benzotriazole-based UV absorber, a benzoate-based UV absorber, a benzophenone-based UV absorber, an acrylate-based UV absorber, a metal complex-based UV absorber, and the like.

Examples of the light stabilizer include a hindered amine-based light stabilizer.

Examples of the near-infrared absorber include a cyanine-based near-infrared absorber, a pyrylium-based infrared absorber, a squarylium-based near-infrared absorber, a croconium-based infrared absorber, an azulenium-based near-infrared absorber, a phthalocyanine-based near-infrared absorber, a dithiol metal complex-based near-infrared absorber, a naphthoquinone-based near-infrared absorber, an anthraquinone-based near-infrared absorber, an indophenol-based near-infrared absorber, an azide-based near-infrared absorber, and the like.

Examples of the plasticizer include a phosphoric acid triester-based plasticizer, a fatty acid monobasic acid ester-based plasticizer, a dihydric alcohol ester-based plasticizer, an oxy acid ester-based plasticizer, and the like.

Examples of the antistatic agent include a fatty acid ester of a polyhydric alcohol, and the like.

The content of each additional component may be appropriately determined taking account of the object. Each additional component is normally used in a ratio of 0.001 to 5 parts by weight, and preferably 0.01 to 1 part by weight, based on 100 parts by weight of the hydrogenated cycloolefin ring-opening polymer.

The resin composition may be prepared by mixing the components according to an ordinary method. The components may be mixed in an appropriate solvent, or may be mixed (kneaded) in a molten state.

The components may be mixed (kneaded) using a melt mixer such as a single-screw extruder, a twin-screw extruder, a Banbury mixer, a kneader, or a feeder ruder. The mixing (kneading) temperature is preferably 200 to 400° C., and more preferably 240 to 350° C. The components may be added at a time, and mixed (kneaded), or may be mixed (kneaded) while adding the components stepwise.

The resin formed article according to one embodiment of the invention may be produced using an arbitrary forming method. Examples of the forming method include an injection forming method, a press forming method, an extrusion forming method, and the like. When the resin formed article is an optical member or the like, it is preferable to use an injection forming method since the desired resin formed article can be obtained with high accuracy.

The melting temperature employed during forming differs depending on the type of resin composition, but is normally 200 to 400° C., and preferably 210 to 350° C. When a mold is used, the mold temperature is normally set to 20° C. to (Tg+15°) C., preferably (Tg−30°) C. to (Tg+10°) C., and more preferably (Tg−20°) C. to (Tg+5°) C. Note that Tg is the glass transition temperature of the resin composition.

The hydrogenated cycloolefin ring-opening polymer according to one embodiment of the invention that is used as a raw material for producing the resin formed article according to one embodiment of the invention exhibits excellent thermal yellowing resistance, excellent high-temperature dimensional stability, and excellent formability, and the resin formed article according to one embodiment of the invention also exhibits excellent thermal yellowing resistance, excellent high-temperature dimensional stability, and excellent formability.

The resin formed article according to one embodiment of the invention preferably has a glass transition temperature of 140 to 165° C., a melt flow rate of 8 g/10 min or more as measured in accordance with JIS K 6719 at a temperature of 280° C. under a load of 21.18 N (2.16 kgf), and a flexural strength of 60 MPa or more as measured by a flexural test in accordance with JIS K 7171 at a test speed of 2 mm/min.

The resin formed article according to one embodiment of the invention is suitably used as an optical member such as an optical lens, a prism, and a light guide.

The resin formed article according to one embodiment of the invention is particularly preferably used as an optical member (e.g., lens) that is used for a camera installed in an automobile.

EXAMPLES

The invention is further described below by way of examples and comparative examples. Note that the invention is not limited to the following examples. The units "parts" and "%" used in connection with the examples respectively refer to "parts by weight" and "wt %" unless otherwise indicated.

The properties of the hydrogenated cycloolefin ring-opening polymer and the like were measured as described below.

(1) Weight Average Molecular Weight

The weight average molecular weight (Mw) (standard polyisoprene-equivalent weight average molecular weight) of the hydrogenated cycloolefin ring-opening polymer was determined by gel permeation chromatography (GPC) (eluent: cyclohexane).

Standard polyisoprene (Mw=602, 1390, 3920, 8050, 13,800, 22,700, 58,800, 71,300, 109,000, or 280,000) manufactured by Tosoh Corporation was used as the standard polyisoprene.

The molecular weight was measured in a state in which three columns ("TSKgel G5000HXL", "TSKgel G4000HXL", and "TSKgel G2000HXL" manufactured by Tosoh Corporation) were connected in series (flow rate: 1.0 mL/min, sample injection amount: 100 μL, column temperature: 40° C.).

(2) Glass Transition Temperature (Tg)

The glass transition temperature of the hydrogenated cycloolefin ring-opening polymer was measured in accordance with JIS K 6911 (temperature increase rate: 10° C./min) using a differential scanning calorimeter ("DSC 6220" manufactured by SII NanoTechnology Inc.).

(3) Racemo Dyad Ratio

The racemo diad ratio in the hydrogenated cycloolefin ring-opening polymer with respect to the repeating unit derived from tetracyclododecene was determined by subjecting the hydrogenated cycloolefin ring-opening polymer to $^{13}$C-NMR measurement using deuterated o-dichlorobenzene as a solvent, and calculating the racemo diad ratio based on the intensity ratio of the signal (51.7 ppm) attributed to racemo diads to the signal (51.6 ppm) attributed to meso diads.

(4) Melt Flow Rate (MFR)

The melt flow rate of the resin composition including the hydrogenated cycloolefin ring-opening polymer was measured in accordance with JIS K 6719 at a temperature of 280° C. under a load of 21.18 N (2.16 kgf).

(5) Flexural Strength

The pellets of the resin composition including the hydrogenated cycloolefin ring-opening polymer were introduced into an injection forming machine ("ROBOSHOT α-100B" manufactured by FANUC Corporation), and injection-formed at a resin temperature of 280° C., a mold temperature of (Tg−15°) C., and an injection pressure of 100 MPa to prepare a resin sheet having a length of 80 mm, a width of 10 mm, and a thickness of 4 mm.

The resin sheet was subjected to a flexural test in accordance with JIS K 7171 (test speed: 2 mm/min) using an autograph ("AGS-5kNJ•TCR2" manufactured by Shimadzu Corporation) to measure the flexural strength (MPa) of the resin sheet.

(6) Evaluation of Thermal Yellowing Resistance

The pellets of the resin composition including the hydrogenated cycloolefin ring-opening polymer were introduced into an injection forming machine ("ROBOSHOT α-100B" manufactured by FANUC Corporation), and injection-formed at a resin temperature of 280° C., a mold temperature of (Tg−15°) C., and an injection pressure of 100 MPa to prepare a resin sheet having a length of 70 mm, a width of 30 mm, and a thickness of 3 mm.

The thermal yellowing resistance was evaluated as described below using the resin sheet as a specimen.

The specimen was placed in an oven, and heated at 125° C. for 1,000 hours.

The yellowness index (YI) of the specimen was measured in accordance with JIS K 7103 using a color difference meter (blank: air). A value obtained by subtracting the yellowness index (YI) in air from the measured yellowness index YI was taken as the change in yellowness index (ΔYI) of the specimen. A small change in yellowness index (ΔYI) indicates that the specimen yellowed to only a small extent at a high temperature (i.e., had good thermal yellowing resistance).

(7) Evaluation of High-Temperature Dimensional Stability

The pellets of the resin composition including the hydrogenated cycloolefin ring-opening polymer were introduced into an injection forming machine ("ROBOSHOT α-100B" manufactured by FANUC Corporation), and injection-formed at a resin temperature of 300° C., a mold temperature of (Tg−5°) C., and an injection pressure of 40 MPa using a mold (see FIGURE) designed to form a lens having a convex surface having a radius of curvature of 5.73 mm, a concave surface having a radius of curvature of 3.01 mm, a diameter of 4.5 mm (diameter of lens part: 3 mm), and a center thickness of 0.20 mm, to prepare a resin formed article (lens).

The dimensions of the resulting lens were measured using an ultra-precision point autofocus probe 3D measuring instrument ("NH-3SP" manufactured by Mitaka Kohki Co., Ltd.) within a range of 1 mm from the center of the lens, and the minimum value of the dimensional difference from the design value R was subtracted from maximum value of the dimensional difference from the design value R to calculate a PV value (micrometers).

The lens was placed in an oven, and heated at 130° C. for 170 hours, and the PV value was calculated as described above. The PV value before heating and the PV value after heating were compared.

A small difference between the PV value before heating and the PV value after heating indicates that the dimensional change at a high temperature was small.

(8) Evaluation of Formability (by Means of Observation of Weld Line)

The surface of the resin formed article (lens) obtained as described above (see (7)) was observed using a microscope, and the length of the weld line that occurred in the direction opposite to the gate was measured. The formability was evaluated in accordance with the following standard.

Very good: The length of the weld line was less than 1.0 mm.
Good: The length of the weld line was 1.0 mm or more and less than 1.5 mm.
Bad: The length of the weld line was 1.5 mm or more.

Example 1

A polymerization reactor of which the inside had been dried and in which the internal atmosphere had been replaced by nitrogen, was charged with 2.0 parts (1% based on the total amount of monomers subjected to polymerization) of a monomer mixture including 6-ethylidene-2-tetracyclododecene (ETD) (30%) and tetracyclododecene (TCD) (70%), 785 parts of dehydrated cyclohexane, 1.21 parts of a molecular weight modifier (1-hexene), 0.98 parts of a solution (concentration: 19%) prepared by dissolving diethylaluminum ethoxide in n-hexane, and 11.7 parts of a solution (concentration: 2.0%) prepared by dissolving tungsten(phenylimido)tetrachloride-tetrahydrofuran in toluene, and the mixture was stirred at 50° C. for 10 minutes.

198.0 parts of a monomer mixture having the same composition as described above was continuously added dropwise to the polymerization reactor over 150 minutes while stirring the mixture at 50° C. After completion of the dropwise addition, the mixture was stirred for 30 minutes, and the polymerization reaction was terminated by adding 4 parts of isopropyl alcohol. The conversion rate of the monomers into a polymer determined by subjecting the polymer solution to gas chromatography was 100%.

300 parts of the polymer solution was transferred to an autoclave equipped with a stirrer, and 32 parts of cyclohexane and 3.8 parts of a nickel catalyst supported on diatomaceous earth ("T8400RL" manufactured by Nikki Chemical Co., Ltd., nickel content: 58%) were added to the polymer solution. After replacing the internal atmosphere inside the autoclave by hydrogen, the mixture was reacted at 190° C. for 6 hours under a hydrogen pressure of 4.5 MPa.

After completion of the hydrogenation reaction, the mixture was filtered through a pressure filter ("FUNDABAC filter" manufactured by IHI Corporation) (filtration bed: diatomaceous earth ("Radiolite (registered trademark) #500")) under a pressure of 0.25 MPa to obtain a colorless and transparent solution.

After the addition of 0.5 parts (based on 100 parts of the hydrogenated polymer) of pentaerythrityl tetrakis[3-(3,5-di-t-butyl-4-hydroxyphenyl)propionate] ("IRGANOX (registered trademark) 1010" manufactured by Ciba Specialty Chemicals Co., Ltd.) (antioxidant) to the solution, foreign matter was removed by filtration using a filter ("Zeta Plus (registered trademark) 30H" manufactured by Cuno Filter, pore size: 0.5 to 1 micrometer) and a metal fiber filter (manufactured by Nichidai Corporation, pore size: 0.4 micrometers).

The solvent (cyclohexane) and other volatile components were removed from the filtrate at a temperature of 290° C. under a pressure of 1 kPa or less using a cylindrical evaporator (manufactured by Hitachi Ltd.). The residue was extruded in the shape of a strand in a molten state from a die connected to the evaporator, cooled with water, and cut using a pelletizer ("OSP-2" manufactured by Osada Seisakusho) to obtain pellets.

The above tests and evaluation processes were performed using the resulting pellets. The results are listed in Table 1.

Note that the hydrogenation rate achieved by the hydrogenation reaction was 99% or more (hereinafter the same).

Example 2

Pellets were obtained in the same manner as in Example 1, except that a monomer mixture including TCD (80%), ETD (10%), and dicyclopentadiene (DCPD) (10%) was used, and the tests and the evaluation processes were performed in the same manner as described above. The results are listed in Table 1.

Example 3

Pellets were obtained in the same manner as in Example 1, except that a monomer mixture including TCD (80%), DCPD (10%), and methanotetrahydrofluorene (MTF) (10%) was used, and the tests and the evaluation processes were performed in the same manner as described above. The results are listed in Table 1.

Example 4

Pellets were obtained in the same manner as in Example 1, except that a monomer mixture including TCD (70%), DCPD (10%), and MTF (20%) was used, and the tests and the evaluation processes were performed in the same manner as described above. The results are listed in Table 1.

Comparative Example 1

Pellets were obtained in the same manner as in Example 1, except that a monomer mixture including TCD (92%) and norbornene (NB) (8%) was used, and the amount of 1-hexene (molecular weight modifier) was changed to 0.8 parts, and the tests and the evaluation processes were performed in the same manner as described above. The results are listed in Table 1.

Comparative Example 2

Pellets were obtained in the same manner as in Example 1, except that a monomer mixture including TCD (90%) and NB (10%) was used, and the tests and the evaluation processes were performed in the same manner as described above. The results are listed in Table 1.

Comparative Example 3

A polymerization reactor of which the inside had been dried and in which the internal atmosphere had been replaced by nitrogen, was charged with 2.0 parts (1% based on the total amount of monomers subjected to polymerization) of MTF, 785 parts of dehydrated cyclohexane, 0.86 parts of a molecular weight modifier (1-hexene), 0.42 parts of diisopropyl ether, 0.11 parts of isobutyl alcohol, 1.80 parts of a solution (concentration: 15%) prepared by dissolving triisobutylaluminum in n-hexane, and 13.4 parts of a solution (concentration: 0.65%) prepared by dissolving tungsten hexachloride in cyclohexane, and the mixture was stirred at 55° C. for 10 minutes.

198.0 parts of MTF and 20.1 parts of a solution (concentration: 0.65%) prepared by dissolving tungsten hexachloride in cyclohexane were continuously added dropwise to the polymerization reactor respectively over 150 minutes while stirring the mixture at 50° C. After completion of the dropwise addition, the mixture was stirred for 30 minutes, and the polymerization reaction was terminated by adding 0.4 parts of isopropyl alcohol.

The subsequent steps were performed in the same manner as in Example 1, and the tests and the evaluation processes were performed in the same manner as described above. The results are listed in Table 1.

Comparative Example 4

Pellets were obtained in the same manner as in Comparative Example 3, except that the amount of 1-hexene (molecular weight modifier) was changed to 0.6 parts, 5 parts of a nickel catalyst supported on alumina ("N163A" manufactured by Nikki Chemical Co., Ltd.) was used instead of the nickel catalyst supported on diatomaceous earth, and the hydrogenation reaction was effected at a reaction temperature of 230° C. for 8 hours under a hydrogen pressure of 4.5 MPa, and the tests and the evaluation processes were performed in the same manner as described above. The results are listed in Table 1.

Comparative Example 5

Pellets were obtained in the same manner as in Comparative Example 3, except that a monomer mixture including TCD (25%), MTF (70%), and NB (5%) was used instead of MTF, and the amount of 1-hexene (molecular weight modifier) was changed to 1.2 parts, and the tests and the evaluation processes were performed in the same manner as described above. The results are listed in Table 1.

TABLE 1

|  |  | Example | | | | Comparative Example | | | | |
| --- | --- | --- | --- | --- | --- | --- | --- | --- | --- | --- |
|  |  | 1 | 2 | 3 | 4 | 1 | 2 | 3 | 4 | 5 |
| Monomer composition (%) | TCD | 70 | 80 | 80 | 70 | 92 | 90 | — | — | 25 |
|  | MTF | — | — | 10 | 20 | — | — | 100 | 100 | 70 |
|  | NB | — | — | — | — | 8 | 10 | — | — | 5 |
|  | DCPD | — | 10 | 10 | 10 | — | — | — | — | — |
|  | ETD | 30 | 10 | — | — | — | — | — | — | — |
| Racemo diad/meso diad ratio |  | 85/15 | 81/19 | 83/17 | 78/22 | 80/20 | 78/22 | — | — | 45/55 |
| Weight average molecular weight (Mw) |  | 24,000 | 22,300 | 23,000 | 26,000 | 61,500 | 29,400 | 31,500 | 46,000 | 19,000 |
| Glass transition temperature (Tg) (° C.) |  | 151 | 150 | 152 | 151 | 149 | 134 | 156 | 138 | 143 |
| Melt flow rate (g/10 min) |  | 11 | 21 | 24 | 25 | 2 | 23 | 25 | 24 | 52 |
| Flexural strength (MPa) |  | 68 | 79 | 85 | 90 | 79 | 59 | 78 | 111 | 64 |
| Evaluation of thermal yellowing resistance (ΔYI) |  | 11 | 10 | 12 | 15 | 13 | 11 | 45 | 13 | 35 |
| Evaluation of high-temperature dimensional stability (PV value) |  | 0.3 | 0.4 | 0.2 | 0.3 | 0.4 | 15 | 0.2 | 11.6 | 0.8 |
| Evaluation of formability (by means of observation of weld line) |  | Good | Good | Good | Good | Bad | Good | Good | Good | Very good |

The following were confirmed from the results listed in Table 1.

The hydrogenated cycloolefin ring-opening polymers obtained in Examples 1 to 4 exhibited thermal yellowing resistance, high-temperature dimensional stability, and formability in a well-balanced manner.

The hydrogenated cycloolefin ring-opening polymer obtained in Comparative Example 1 exhibited excellent mechanical strength, but had a low melt flow rate, and exhibited inferior formability since the weight average molecular weight was too high. When the weight average molecular weight was increased in order to improve the formability, the resulting hydrogenated cycloolefin ring-opening polymer exhibited inferior mechanical strength (Comparative Example 2).

The hydrogenated cycloolefin ring-opening polymers obtained in Comparative Examples 2, 4, and 5 had a low glass transition temperature, and exhibited inferior high-temperature dimensional stability.

The hydrogenated cycloolefin ring-opening polymers obtained in Comparative Examples 3 and 5 that included a large amount of a repeating unit derived from methanotetrahydrofluorene, exhibited inferior thermal yellowing resistance. The thermal yellowing resistance could be improved by changing the hydrogenation reaction conditions, but the glass transition temperature decreased, and the high-temperature dimensional stability deteriorated (see Comparative Example 4).

The invention claimed is:

1. A hydrogenated cycloolefin ring-opening polymer comprising a repeating unit derived from tetracyclododecene, and a repeating unit derived from an additional norbornene-based monomer, the hydrogenated cycloolefin ring-opening polymer comprising the repeating unit derived from tetracyclododecene in a ratio of 60 wt % or more and 85 wt % or less based on the total amount of repeating units, and comprising the repeating unit derived from the additional norbornene-based monomer in a ratio of 15 wt % or more and 40 wt % or less based on the total amount of repeating units, the hydrogenated cycloolefin ring-opening polymer having a racemo diad ratio of 65% or more with respect to the repeating unit derived from tetracyclododecene, the hydrogenated cycloolefin ring-opening polymer having a weight average molecular weight (Mw) of 10,000 to 40,000, and wherein a resin formed article obtained by forming the hydrogenated cycloolefin ring-opening polymer, has a glass transition temperature of 140 to 165° C., a melt flow rate of 8 g/10 min or more as measured in accordance with JIS K 6719 at a temperature of 280° C. under a load of 21.18 N, and a flexural strength of 60 MPa or more as measured by a flexural test in accordance with JIS K 7171 at a test speed of 2 mm/min.

2. The hydrogenated cycloolefin ring-opening polymer according to claim 1, the hydrogenated cycloolefin ring-opening polymer comprising the repeating unit derived from the combination of tetracyclododecene and any species of the additional polycyclic norbornene-based monomer that has a polycyclic structure having three or more rings in a ratio of 95 wt % or more based on the total amount of repeating units.

3. A resin formed article obtained by forming a resin composition that comprises the hydrogenated cycloolefin ring-opening polymer according to claim 1.

4. An optical member comprising the resin formed article according to claim 3.

* * * * *